US005949878A

United States Patent [19]

Burdge et al.

[11] Patent Number: 5,949,878

[45] Date of Patent: *Sep. 7, 1999

[54] METHOD AND APPARATUS FOR PROVIDING VOICE PRIVACY IN ELECTRONIC COMMUNICATION SYSTEMS

[75] Inventors: Robert J. Burdge, Olathe, Kans.; Steven P. Poulsen, Lincoln, Nebr.

[73] Assignee: Transcrypt International, Inc., Lincoln, Nebr.

[ * ] Notice: This patent is subject to a terminal disclaimer.

[21] Appl. No.: 08/673,348

[22] Filed: Jun. 28, 1996

[51] Int. Cl.[6] .............................. H04K 1/02; H04N 7/167

[52] U.S. Cl. .............................. 380/9; 380/19

[58] Field of Search .............................. 380/9, 19, 38, 380/39, 49

[56] References Cited

U.S. PATENT DOCUMENTS

| | | | |
|---|---|---|---|
| 2,411,206 | 11/1946 | Guanella | 380/38 |
| 2,509,716 | 5/1950 | Aubert | 380/38 |
| 2,510,338 | 6/1950 | Guanella | 380/38 |
| 3,777,964 | 12/1973 | Allen et al. | 179/1.5 |
| 4,525,844 | 7/1985 | Scheuermann . | |
| 4,652,699 | 3/1987 | Akaiwa . | |
| 4,694,467 | 9/1987 | Mui | 380/34 X |
| 4,817,141 | 3/1989 | Taguchi . | |
| 4,959,863 | 9/1990 | Azuma et al. . | |
| 4,984,219 | 1/1991 | Brown et al. . | |
| 5,065,430 | 11/1991 | Torii et al. . | |
| 5,159,631 | 10/1992 | Quan et al. | 380/19 |
| 5,418,815 | 5/1995 | Ishikawa et al. | 375/216 |
| 5,471,531 | 11/1995 | Quan . | |
| 5,778,073 | 7/1998 | Busching et al. | 380/9 X |
| 5,796,838 | 8/1998 | Heerman | 380/38 |

FOREIGN PATENT DOCUMENTS

| | | |
|---|---|---|
| 1 184 698 | 3/1995 | Canada . |
| 0244144 | 10/1986 | Japan . |
| 00221131 | 1/1989 | Japan . |

*Primary Examiner*—Harshad Patel
*Assistant Examiner*—Robin Clark
*Attorney, Agent, or Firm*—Zarley, McKee, Thomte, Voorhees & Sease

[57] ABSTRACT

An apparatus and method for creating voice privacy in electronic voice transmission systems includes the steps of digitizing an analog signal and inverting and rotating the frequency spectrum of the digitized audio signal. From the inverted and rotated spectrum, a complex signal is created from which the real component is extracted to produce a real signal suitable for transmitting. The processing method may optionally include the steps of translating the frequency of the signal spectrum, reducing the sampling rate, shifting the spectrum of the signal again, increasing the sample rate, and extracting the real part of the signal to produce a real signal. The digital signal processing is performed entirely with software. The scrambling and descrambling processes are identical, therefore, the same hardware and software may be used to scramble and descramble the signal.

20 Claims, 8 Drawing Sheets

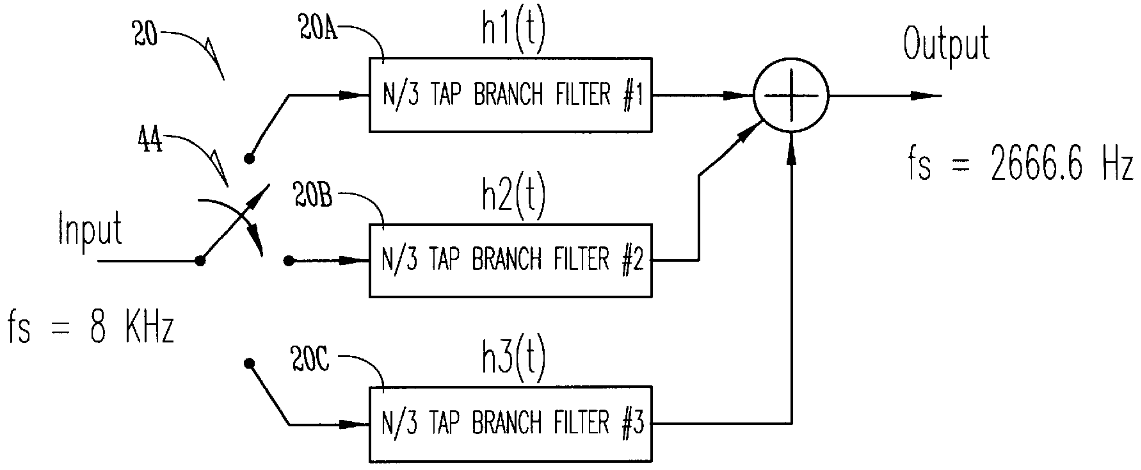

BRANCH FILTER CLOCK RATE = 2666.6 Hz h(t) = prototype N–tap decimation filter impulse response h1(t) = impulse response of branch filter #1 — h1(t) = h(2), h(5), h(8), etc. (*)

h2(t) = impulse response of branch filter #2 — h2(t) = h(1), h(4), h(7), etc.

h3(t) = impulse response of branch filter #3 — h3(t) = h(0), h(3), h(6), etc.

(*) – only one tap of branch #2 has a non–zero value.

*Fig. 4*

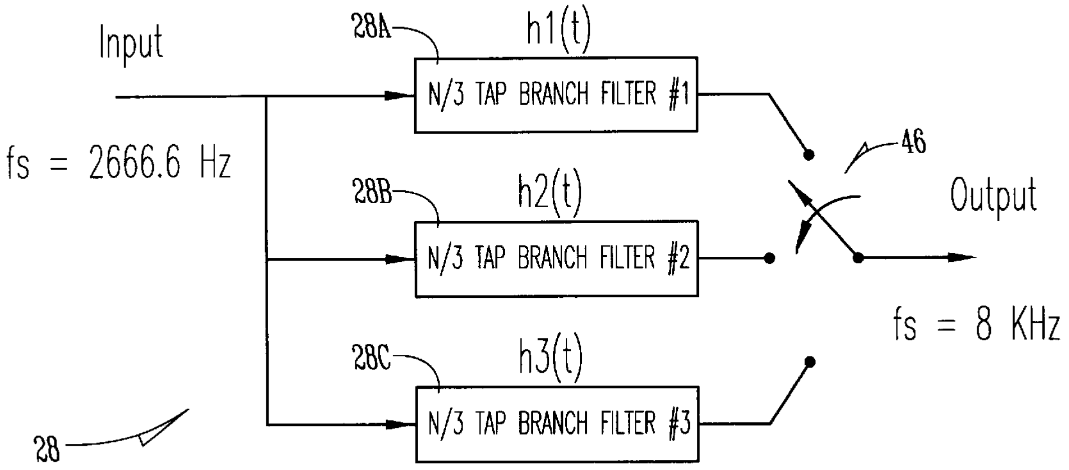

BRANCH FILTER CLOCK RATE = 2666.6 Hz h(t) = prototype N–tap decimation filter impulse response h1(t) = impulse response of branch filter #1 — h1(t) = h(0), h(3), h(6), etc. (*)

h2(t) = impulse response of branch filter #2 — h2(t) = h(1), h(4), h(7), etc.

h3(t) = impulse response of branch filter #3 — h3(t) = h(2), h(5), h(8), etc.

(*) – only one tap of branch #2 has a non–zero value.

*Fig. 5*

METHOD AND APPARATUS FOR PROVIDING VOICE PRIVACY IN ELECTRONIC COMMUNICATION SYSTEMS

BACKGROUND OF THE INVENTION

1. Field Of The Invention

The present invention relates to digital signal processing. More particularly the present invention relates to a method and apparatus for providing voice privacy in electronic communications systems.

2. Problems In The Art

In the field of two-way radio communications, it is often desired to have secure communications between the sender and receiver. The most common method of providing security in two-way radio communications is by scrambling the transmitted audio signals and descrambling the received audio signals. Prior art scrambling and descrambling methods have various disadvantages. Most prior art devices involve hardware with excessive complexity and result in poor audio quality after being descrambled. Most prior art scrambling and descrambling systems also are inefficient and require a significant amount of hardware to scramble and descramble the audio signals. Prior art systems typically require separate scrambling and descrambling circuits since the scrambling and descrambling processes are different.

Some prior art scrambling and descrambling methods use a "rolling code" to alter the scrambling method over time to reduce the chances of an unauthorized receiver descrambling the signals. Prior art systems using rolling code descramblers are limited in the frequency that the code changes without causing a distortion to the signal. Also, when prior art systems use a rolling code, spectral loss is observed.

Therefore there is room for improvement in the art. The present invention represents an improvement over the state of the art.

3. Features Of The Invention

A general feature of the present invention is the provision of a method and apparatus for providing voice privacy in electronic communications systems which overcomes problems found in the prior art.

A further feature of the present invention is the provision of a method and apparatus for providing voice privacy in electronic communications systems which uses a frequency translation to shift the spectrum of the signal, reduces the sampling rate, shifts the spectrum again, increases the sampling rate, shifts the spectrum again, and extracts the real part of the complex signal for transmission.

A further feature of the present invention is the provision of a method and apparatus for providing voice privacy in electronic communications systems which eliminates the need for tunable filters and the like by digitizing an audio signal and uses a digital signal processor (DSP) to process the signal.

A further feature of the present invention is the provision of a method and apparatus for providing voice privacy in electronic communications systems which creates a scrambled signal which can be efficiently and reliably sent through wireless communication systems or over telephone lines.

A further feature of the present invention is the provision of a method and apparatus for providing voice privacy in electronic communications systems which uses software to process the digitized audio signal rather than discrete analog components.

A further feature of the present invention is the provision of a method and apparatus for providing voice privacy in electronic communications systems which uses the identical process and hardware to scramble and descramble a signal.

A further feature of the present invention is the provision of a method and apparatus for providing voice privacy in electronic communications systems which preserves more of the original audio spectrum than previous methods.

A further feature of the present invention is the provision of a method and apparatus for providing voice privacy in electronic communications systems which improves the security of the transmission by allowing for more rapid changing of inversion frequencies than in previous methods.

These as well as other objects, features, and advantages of the present invention will become apparent from the following specification and claims.

SUMMARY OF THE INVENTION

The present invention relates to a method and apparatus for processing digitized audio signals to scramble and descramble audio signals for providing security in electronic communications. The signals are processed by inverting and rotating the frequency spectrum of the digitized audio signal. From the inverted and rotated spectrum, a complex signal is created from which the real component is extracted to produce a real signal suitable for transmitting. The processing method may optionally include the steps of translating the frequency of the signal spectrum, reducing the sampling rate, shifting the spectrum of the signal again, increasing the sample rate, and extracting the real part of the signal to produce a real signal.

An apparatus for practicing the method may include an analog to digital converter for sampling and digitizing an audio signal, a processor for processing the digitized audio signal, and a digital to analog converter for converting the digitized processed signal to an analog signal. The scrambling and descrambling processes are identical, therefore, the same hardware and software may be used to scramble and descramble the signal.

BRIEF DESCRIPTION OF THE DRAWINGS

FIG. 4 shows a block diagram of the polyphase filter used to perform the 3× decimation shown in FIGS. 1A and 1B.

FIG. 5 shows a block diagram of the polyphase filter used to perform the 3× interpolation shown in FIGS. 1A and 1B.

DETAILED DESCRIPTION OF THE PREFERRED EMBODIMENT

Figure 1A:
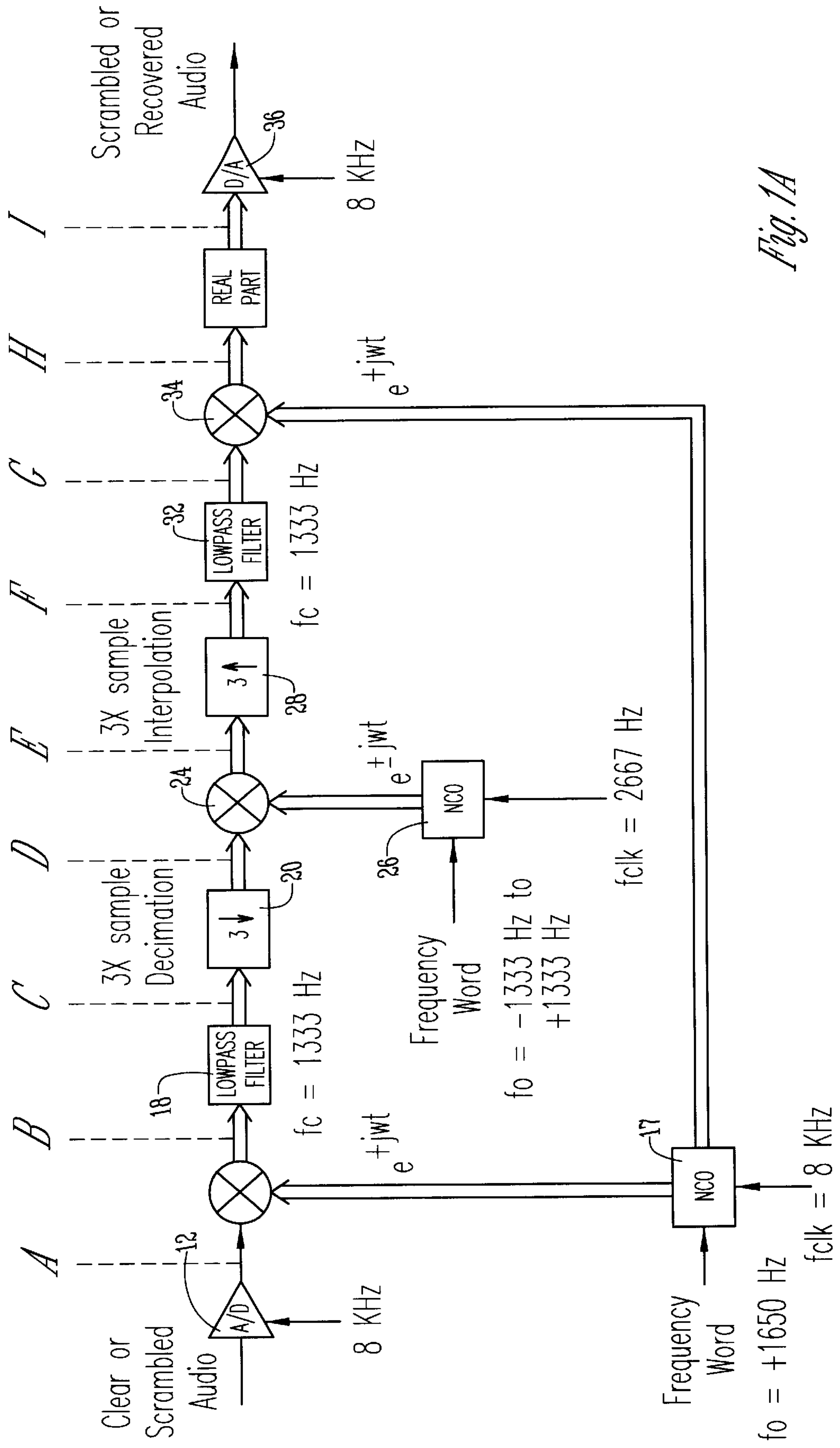
FIG. 1A is a flow chart showing the process by which the audio spectrum is inverted and rotated.

The present invention will be described as it applies to its preferred embodiment. It is not intended that the present invention be limited to the described embodiment. It is intended that the invention cover all alternatives, modifications, and equivalences which may be included within the spirit and scope of the invention.

Generally, the present invention is a method for providing voice privacy in electronic systems. Audio signals in the frequency range of approximately 300 hertz (Hz) to 3 kilohertz (KHz) are subjected to the process of the present invention in which the frequency spectrum of the signal is inverted and rotated. This scrambling process renders the resulting audio signal virtually unintelligible. The scrambled signal can then be sent through wireless systems or over telephone lines with the content of the message protected. When the scrambled signal is received by the receiver the signal is subjected to the descrambling process to recover the original audio signal.

Real signals have a property of symmetry in the frequency spectrum. Since the scrambling process desires a non-symmetrical spectrum, complex signals must be used. For real time varying signals a(t) and b(t), a complex signal is constructed as c(t)=a(t)+jb(t) where j=sqrt(−1), a(t)−real part; jb(t)=imaginary part. A(t) and b(t) can be physically processed as two real signals using complex operational rules. When a(t)=cos ωt and b(t)=sin ωt then c(t)=cos ωt+j sin ωt=$e^{j\omega t}$.

Briefly, the digital signal processing technique used by the present invention begins with the analog voice signal being sampled and digitized using a conventional analog to digital converter. The sampled audio signal is then subjected to a positive complex frequency translation that centers the negative frequency components of the desired audio signal around 0 Hz. The sampling rate of the resulting complex baseband signal is then reduced to the Complex Nyquist sampling rate. The Complex Nyquist sampling rate is a sampling rate at which the bandwidth of the desired complex signal extends from $-F_S/2$ to $+F_S/2$, where $F_S$ denotes the sampling rate. The sampling rate reduction can be an integer (or any rational number) reduction. After the sampling rate is reduced, the complex baseband signal is subjected to an arbitrary complex frequency translation that ranges from $-F_S/2$ to $+F_S/2$. As a result of using the Nyquist sampling rate, any frequency translation of the signal causes part of the signal spectrum to be aliased on the opposite end of the band. This is referred to as controlled aliasing because this aliasing is desired. The sampling rate of the signal is then increased by a sufficient amount to allow the signal to be subjected to a final positive complex frequency translation to center the signal frequency in a desired frequency band. The resulting signal spectrum occupies essentially the same bandwidth as the original signal but the frequency spectrum of the signal has been inverted and subjected to arbitrary “wrapped” spectral rotation. The final audio signal is produced by extracting the real part of the complex samples. These samples are then processed in a digital to analog converter to generate an analog waveform. This waveform is a severely distorted version of the input audio signal and the message content is essentially unintelligible. The scrambled signal can be recovered or descrambled with minimal distortion by applying the described process a second time.

FIG. 1A shows a flow chart illustrating the process by which the audio spectrum is inverted and rotated. The present invention performs inversion and rotation entirely with software.

Figure 1B:
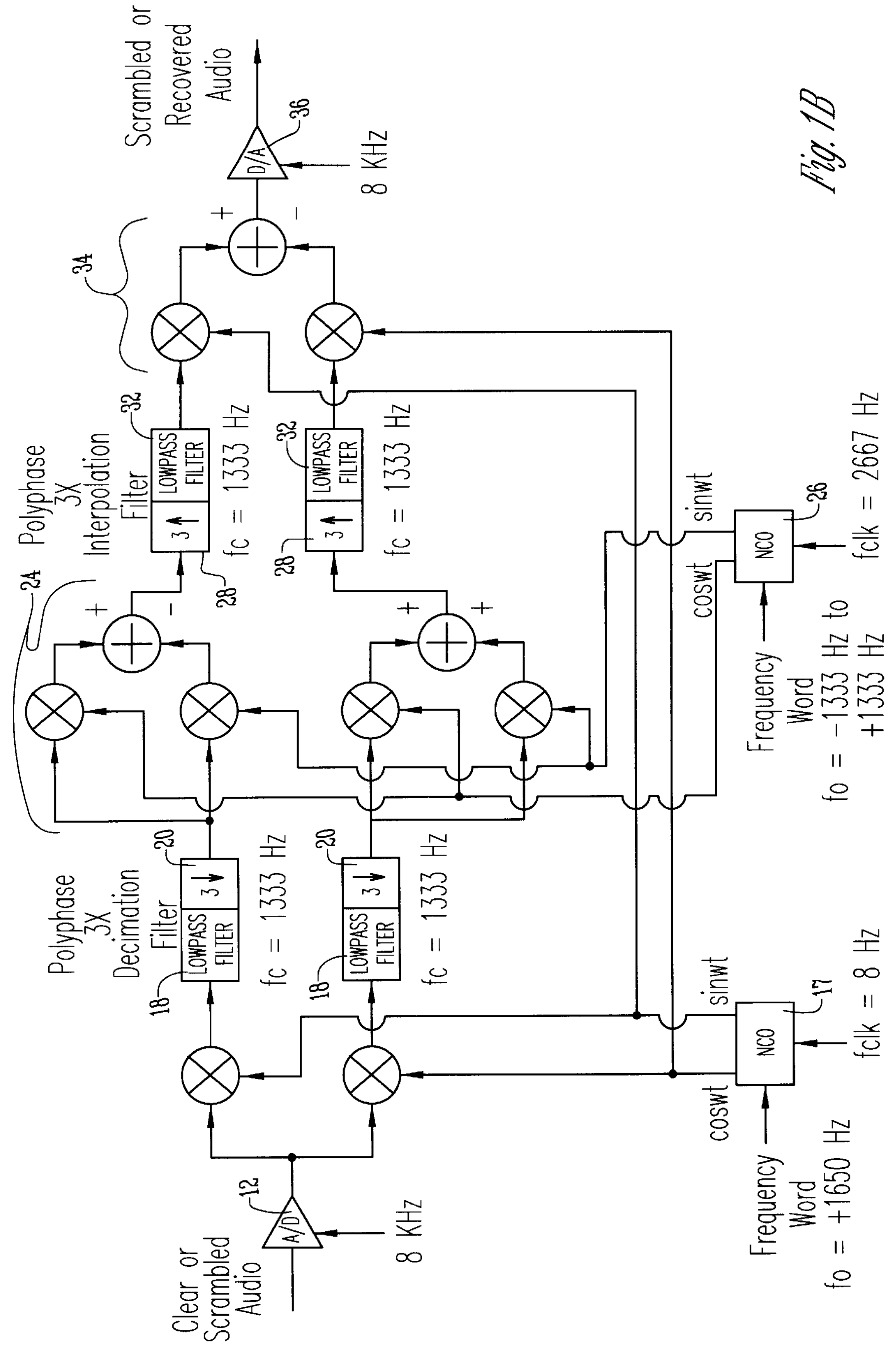
FIG. 1B is a more detailed implementation of the flow chart shown in FIG. 1A.

FIG. 1B shows a more detailed flow chart of the process shown in FIG. 1A. The symbols and descriptions in FIG. 1A indicate to one skilled in the art the functions that the software of the present invention performs.

FIGS. 2A–2I and 3A–3I are a sequence of diagrams illustrating the resulting signal spectrums at various stages the scrambling and descrambling process shown in FIGS. 1A and 1B. The letters A, B, C, D, E, F, G, H, and I shown in FIG. 1A correspond to the FIGS. 2A, 2B, 2C, 2D, 2E, 2F, 2G, 2H, and 2I, respectively, which each show the frequency spectrum of the signal at the stage of the process shown in FIG. 1A. Likewise, the letters A, B, C, D, E, F, G, H, and I shown in FIG. 1A correspond to the FIGS. 3A, 3B, 3C, 3D, 3E, 3F, 3G, 3H, and 3I, respectively, which also each show the frequency spectrum of the signal at the stage of the process shown in FIG. 1A. FIGS. 2A–2I differ from FIGS. 3A–3I because different signals are introduced at step A.

Figure 2A:
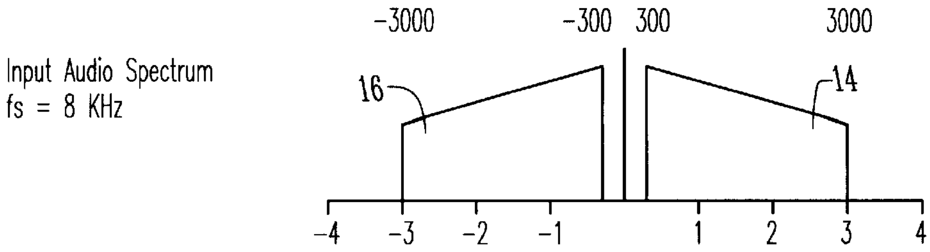
FIGS. 2A–2I show a sequence of diagrams illustrating the resulting signal spectrums at various stages of the scrambling process of the present invention.
Figure 2B:
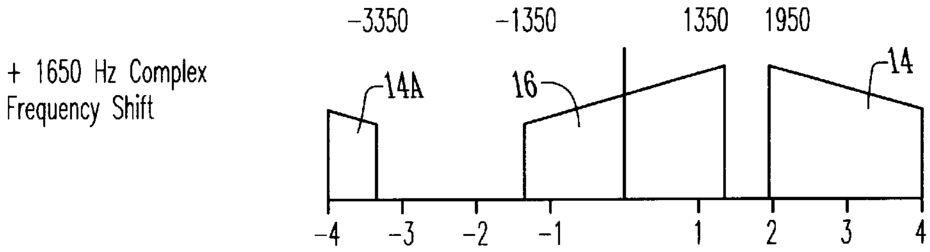

At the beginning of the process, the audio signal is sampled at an 8 KHz rate and digitized using the analog to digital converter 12 shown in FIGS. 1A and 1B. The resulting signal spectrum is shown in FIG. 2A. The resulting spectrum includes an upper side band 14 and a lower side band 16. The digitized signal is then multiplied by a complex tone with a fixed frequency of 1650 Hz. A complex tone is represented by $e^{+j\omega t}$=cos ωt+j sin ωt. This complex tone comes from a numerically controlled oscillator (NCO) 17 shown in FIGS. 1A, 1B and 5 and discussed in detail below. The resulting signal spectrum is shown in FIG. 2B. This translates the lower side band 16 (negative frequencies) of the audio signal (−3 KHz to −300 Hz) to DC creating a complex baseband signal. The upper side band 14 of the audio signal is translated to 3.3 kHz, with some aliasing 14A into the negative frequencies. The upper side band 14 and 14A is an unwanted term and needs to be removed by filtering. In addition, it is desired to bandlimit the desired signal to prevent aliasing, in preparation for performing a 3× decimation.

Figure 2C:
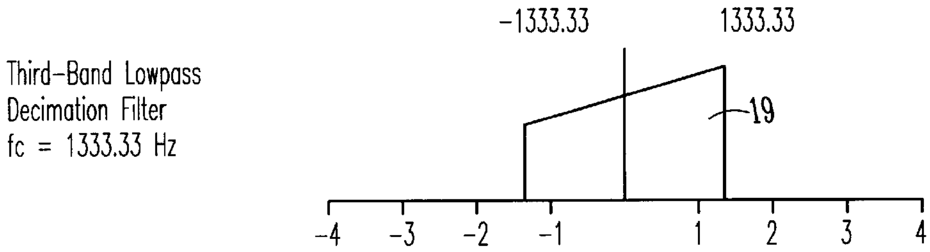
Figure 2D:
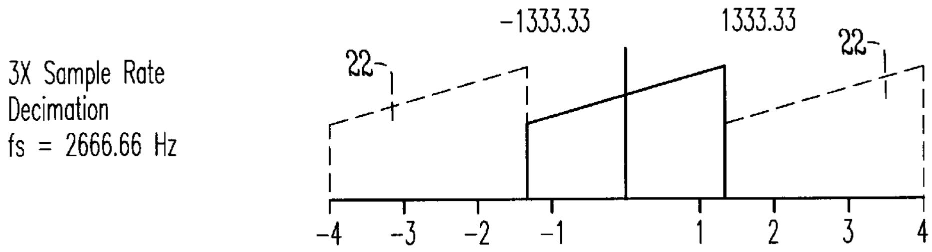
Figure 2E:
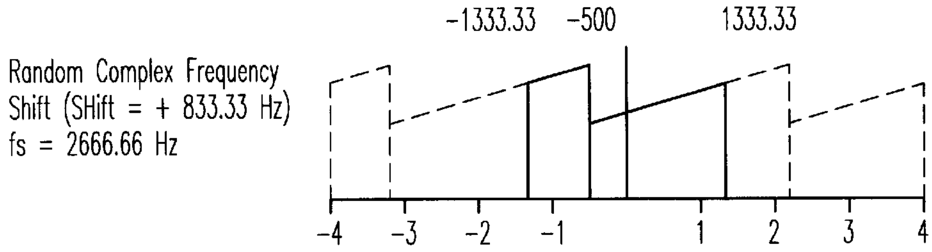

Since the sampling rate will be decimated 3× to 2666.66 Hz (⅓ the input rate, 8 KHz) any signal components above 1333.3 Hz should be removed to the greatest extent possible in order to reduce the effects of undesired aliasing. By implementing a low pass filter 18 with a bandwidth of 1333.3 Hz, the undesired side band and any components from the desired side band that are above 1333.3 Hz can be suppressed. As shown in FIGS. 1A and 1B, a low pass filter 18 is used. The resulting signal spectrum is shown in FIG. 2C. As shown in FIG. 2C, the signal coming out of the low pass filter 18 contains only the band-limited desired side band 19. The sample rate is then reduced to 2666.6 Hz by decimating the signal samples by a factor of 3. In other words, only every third sample of the signal is retained. This is accomplished by decimating filter 20 shown in FIGS. 1A and 1B. The resulting signal spectrum is shown in FIG. 2D. In the frequency domain, this results in a creation of images 22 of the desired signal spectrum that lie immediately adjacent to the desired signal 19. This is a consequence of lowering the maximum frequency (“folding frequency”) from 4 KHz to 1333.3 Hz, which is equal to the bandwidth of the signal. A signal which is sampled at the lowest possible frequency (in this case, 2666.6 Hz) is referred to as being critically sampled. The proximity of the images 22 to the desired signal 19 that results from the critical sampling is the fundamental property used in the inversion process of the present invention. The spectral rotation is then accomplished in an efficient manner. The critically sampled signal is frequency shifted by multiplying the signal by another complex tone of varying random frequency. This step is performed by the mixer 24 and oscillator 26 shown in FIGS. 1A and 1B. The resulting signal spectrum is shown in FIG. 2E. The frequency of the oscillator 26 is determined by the inversion frequency that is desired. The effective inversion frequency is equal to:

$$f_{inv}=(2\times 1650)+f_{shift}$$

The frequency of the random shift can range from −1333.3 Hz to +1333.3 Hz ($\pm f_S/2$) which when plugged into the above equation, yields inversion frequencies ranging from 1967 Hz to 4633 Hz. As shown in FIG. 2E, after the frequency shift, a portion of the spectrum of one of the images 22 will move into the fundamental band (−1333.3 Hz to +1333.3 Hz), in this example, from −1333.3 to −500 Hz. An identical portion of the desired signal will move out of the band. If only the fundamental frequency band is observed, it appears that the spectrum of the desired signal has been rotated about 0 Hz.

Figure 2F:
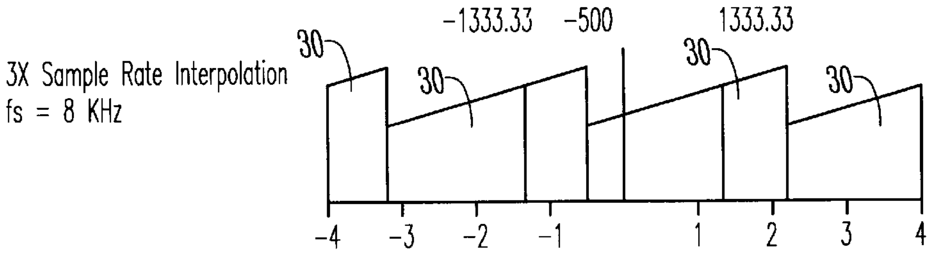
Figure 2G:
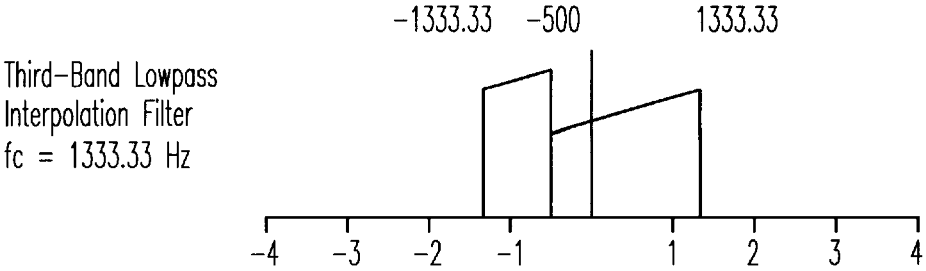

The next step in the process is to increase the sample rate back to 8 KHz, so that the inverted and rotated spectrum can be placed back in the 300 Hz to 3 KHz frequency band (the band of the original sampled signal). This is accomplished by interpolation filter 28 shown in FIGS. 1A and 1B and in detail in FIG. 5. Interpolation is a function used to obtain additional values between sampled values. By performing a 3× interpolation on the signal the sampling rate is increased to 8 KHz. The resulting signal spectrum is shown in FIG. 2F. Two zeros are inserted between each of the 2666.6 Hz samples to create an 8 KHz sampled signal. The resulting signal has an 8 KHz sampling rate but contains undesired image components 30 below the $F_S/2$ frequency of 4 KHz. These undesired images 30 are removed by a low pass filter 32. The same low pass filter 18 used prior to the 3× decimation can be used again. The resulting signal spectrum is shown in FIG. 2G. As shown in FIG. 2G, after the low pass filtering, there exists a single complex baseband signal with an inverted and rotated spectrum.

Figure 2H:
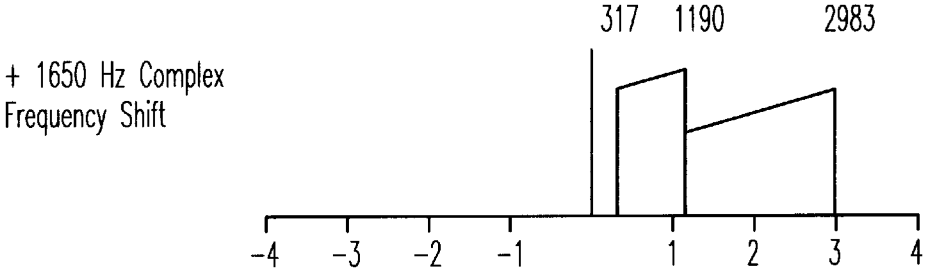
Figure 2I:
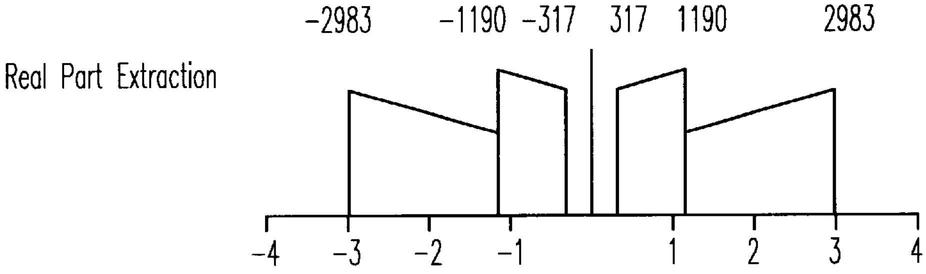
Figure 3A:
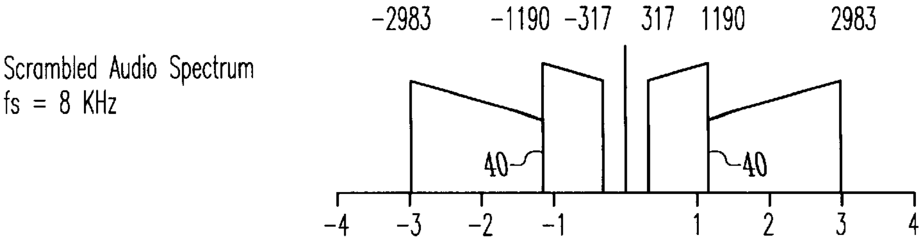
FIGS. 3A–3I show a sequence of diagrams illustrating the resulting signal spectrums at various stages of the descrambling process of the present invention.
Figure 3B:
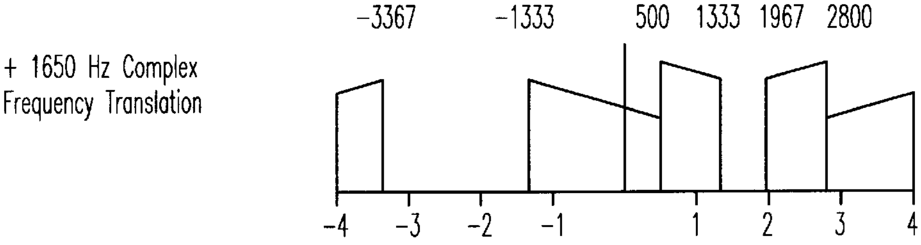
Figure 3C:
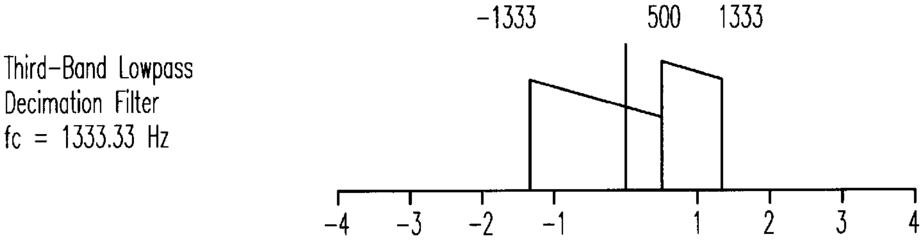
Figure 3D:
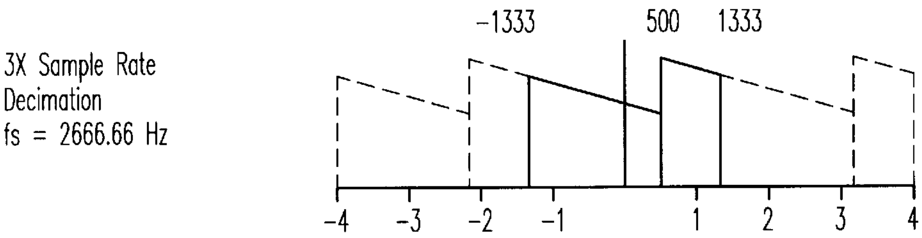
Figure 3E:
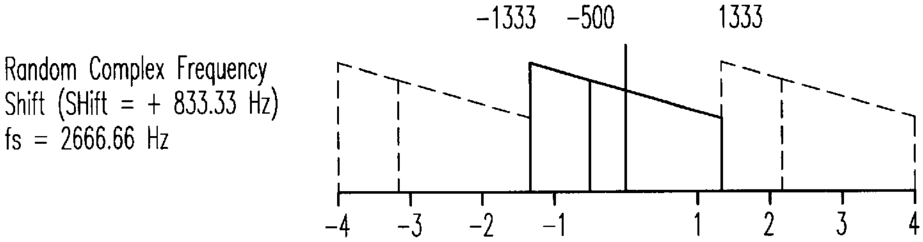
Figure 3F:
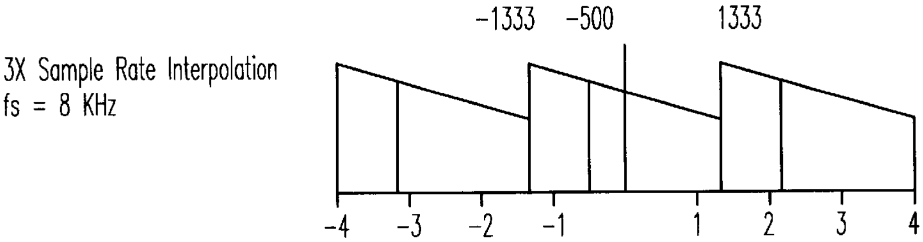
Figure 3G:
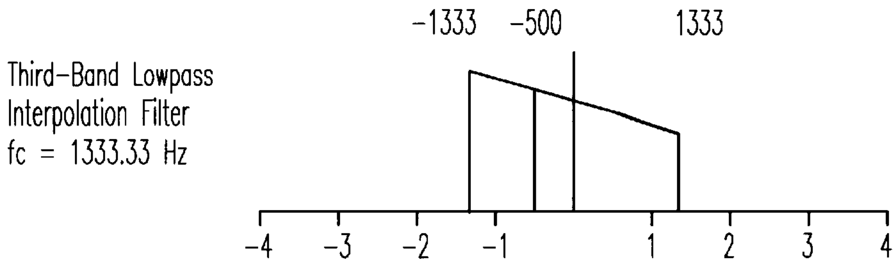
Figure 3H:
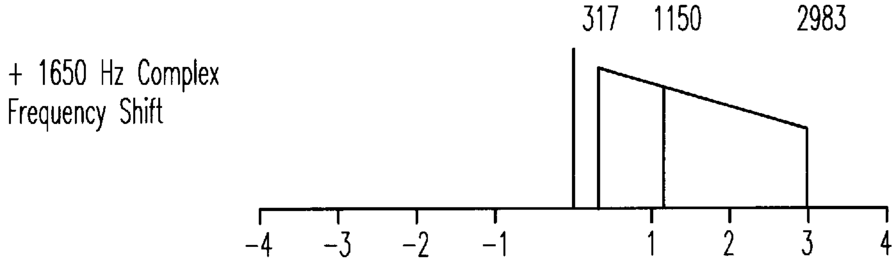
Figure 3I:
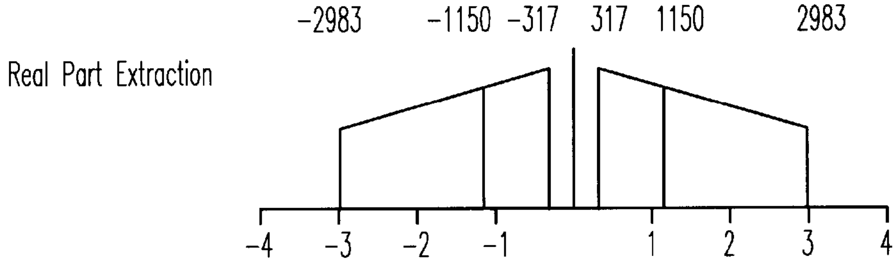

The final step in the process is to multiply the complex baseband signal by another complex tone with a frequency of 1650 Hz. This is accomplished with mixer 34 and NCO 17. The resulting signal spectrum is shown in FIG. 2H. This step shifts the inverted and rotated spectrum to the 317 Hz to 2983 Hz band. At this point the signal is still complex since its frequency spectrum is single sided, i.e., there is no complimentary frequency components in the negative frequency band. To produce a real signal (having complimentary frequency components in the positive and negative frequency bands) which is required for transmission, the real component of the complex signal is extracted and the imaginary component is discarded. The resulting signal spectrum is shown in FIG. 2I. The resulting signal has a spectrum that corresponds to an in-place inversion and rotation of the original audio spectrum which is shown in FIG. 2A.

These processing steps must be performed on sampled data. Preferably, the processing is performed with software although an ASIC (Application-Specific Integrated Circuit) or FPGA could be used to perform the required operations. The preferred embodiment uses a Digital Signal Processor (DSP) part number MSP58C80. This fixed point provides adequate resources and functionality in a lost cost, low part count chip set. Assembly programming language is used for efficiency, although other languages could be used.

The resulting digitized real signal can then be converted to an analog signal by digital to analog converter 36 shown in FIGS. 1A and 1B. The analog signal can then be transmitted by a wireless system or over a phone line, for example. The scrambled audio signal can then be received by a receiver and descrambled.

The scrambling/descrambling algorithm described above is symmetric. Repetitively performing the steps described causes the signal to toggle between a scrambled and a clear state. In other words, the scrambling and descrambling algorithms use identical processing. FIGS. 3A through 3I show the corresponding spectrums for the descrambling of the signal scrambled in FIG. 2A–I. In FIGS. 3A through 3I, a line 40 is retained that indicates where the original split was made in the audio spectrum when the spectral rotation was performed.

With the perfect lowpass filtering shown in the illustrations, the location of the split point 40 is not a concern. However, since real filters are not perfect, with real filters there is necessarily a transition band between the passband (the frequency band passed by the filter) and the stopband (the frequency stopped by the filter) of the frequency spectrum. Finite Impulse Response (FIR) filters are used with the present invention because of the necessity of avoiding phase distortion in the recovered audio signal. With practical filters, this transition band causes a deep, narrow notch in the spectrum at the point indicated by the vertical line 40 in the spectrum. The width and depth of the notch is determined by the transition band characteristics of the filter used. This notch moves around within the spectrum of the recovered audio signal as the inversion frequency (determined by NCO 26) changes. If the notch is not made sufficiently narrow, its movement introduces a "warbling" into the recovered audio that can be very distracting to the user. Simulation results determined that any practical FIR filter (less than 1000 coefficients) would create a notch that was too wide to provide truly high quality recovered audio.

To overcome this limitation, a small amount of aliasing is allowed during the decimation and interpolation processes. Instead of requiring the filters 20 and 28 to provide high attenuation to all components above 1333.33 Hz, the filters 20 and 28 are designed such that their −6 dB bandedge occurs at 1333.33 Hz. There are three consequences of this choice of cutoff frequency. First, the depth of the spectral null introduced into the recovered audio spectrum is limited to 3 dB, and its width can be controlled to an adequate level using practical filters. Second, the aliasing occurs over a very narrow band, due to the narrow transition bands of the filters, and only produces image components that are a relatively short distance from their correct locations (a 253 coefficient FIR filter is down 30 dB within 40 Hz). Third, since 1333.33 Hz is exactly ⅓ of the available bandwidth (4 KHz) a special type of filter called a Third Band Filter can be used. As discussed below, the structure of the Third Band Filter allows the number of computations required to be reduced.

The lowpass filters can be efficiently realized by using a Third Band Polyphase Filter. A Third Band Filter is a special type of filter that has two important properties. First, its bandwidth is equal to ⅓ the available bandwidth as determined by the sample rate (1333.3 Hz for an 8 KHz sample rate). Second, when implemented as an FIR filter, every third coefficient (counting from the center peak value) is identically zero. This reduces the required computations by 33%. The term polyphase refers to a specific multi-rate implementation of an FIR filter that can be used when making sampling rate changes. For a factor of N sample rate change, the polyphase implementation saves a factor of N in computations.

For example, for the case of decimation, the output sample rate is reduced relative to the input sample rate. After the signal is lowpass filtered to prevent aliasing, only every 'nth' sample is retained after decimation (here, every '3rd' sample since the filter is a 3× decimation filter). This means that most of the samples calculated as outputs of the FIR filter are ignored. It would be more efficient if these samples were simply not calculated in the first place. This is exactly the approach that is taken in the polyphase filter design. In essence, it is as if after every output calculation of the FIR filter the samples in the filter are shifted by 'n' places instead of only one place. This n position shift is performed at the rate of the decimated output signal, not at the input signal rate. The polyphase implementation makes use of a 1 to n multiplexing operation to accomplish essentially the same thing.

FIG. 4 is a block diagram of the polyphase filter 20 used to perform the 3× decimation. The polyphase filter 20 consists of three parallel branch filters 20A, 20B and 20C. For an N tap FIR filter each branch filter has N/3 taps. A "tap" is one sample delay element. The input signal is demultiplexed across the three branch filters 20A, 20B, and 20C by demultiplexer 44 in sequence such that each branch will receive every third sample of the input. After each branch has received a new input sample, the three branch filter outputs are computed and summed together to form an output sample. Thus one output sample is obtained for every three input samples. The coefficients of the branch filters are determined by dividing the coefficients of the prototype filter across the three branches in sequential fashion. The prototype filter is a third band filter, so one of the branches will have only one non-zero value. This is because every third coefficient of a third band filter is zero, with the exception of the middle coefficient of the response.

FIG. 5 is a block diagram of the polyphase filter 28 used to perform the 3× interpolation. The polyphase filter 28 consists of three parallel branch filters 28A, 28B, and 28C. The outputs of the branch filters are sequentially selected by an output multiplexer 46. For each input sample an output sample is collected from each branch filter. This increases the sample rate by a factor of 3. Like the decimation filter, the coefficients of this filter are determined by dividing up the coefficients of the prototype filter. The coefficients are allocated in a slightly different fashion than those for the decimation filter 20. One of the branches of the interpolation filter 28 also has only one non-zero value. A listing of the prototype filter coefficients, and the branch coefficients for the decimation and interpolation filters 20 and 28 is given in Table 1.

Figure 6:
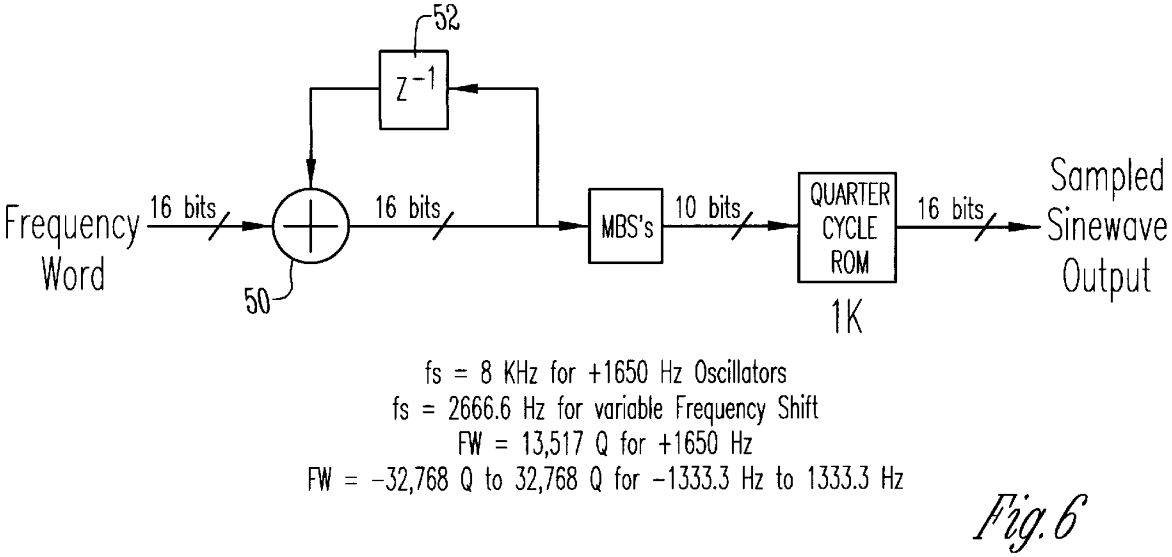
FIG. 6 is a block diagram of the numerically controlled oscillator structure.

The NCOs 17 and 26 used to perform the frequency translations in the present invention are identical, with the exception that the NCO 26 used to do the arbitrary frequency shift must necessarily have a variable input for its frequency word. A block diagram of the NCO structure is shown in FIG. 6. The NCOs 17 and 26 are realized using a phase accumulator 50 that repeatedly adds an input frequency word to a value in an N-bit register 52. The value in the register 52 accumulates and overflows continually, at a rate that depends on the input frequency word value and the bit width of the register. The most significant bits (MSB) of the number in the register are used to address a block of memory that contains sample values from a sinusoidal waveform. By varying the frequency word input, a range of frequencies can be assigned to the synthesized output waveform that results.

The variables allowed in the implementation are the bit widths of the phase accumulator, the address and the data value. Since a digital signal processing (DSP) chip is used, it is logical to select the bit width of the data value to equal the bit width of the processor, usually 16 bits. This will yield a quantization noise floor of −98 dBc. The number of address bits depends on the spurious signal to noise ratio (SNR) required in the synthesized sinusoid. Ten bits of address will yield maximum spur levels in the synthesized output of −60 dBc and requires 1024 words of memory. Actually, since all the values for a sinewave can be determined from the first 90 degrees of the waveform, only ¼ of a sinewave need be stored, which would require only 256 words of memory. For phases of the sinewave beyond 90 degrees, the values in memory are either addressed in reverse order, negated or both in order to produce the entire sinewave. The number of bits in the accumulator is determined by the required frequency accuracy. A 16 bit phase accumulator will yield a residual frequency error in the synthesized output of 0.366 Hz, which is adequate.

The present invention operates as follows. A user of a communication system, will utilize the present invention to provide voice privacy. If the invention is utilized by installation in the communication system, scrambling and descrambling is automatic. The system is installed by placing the system between the transceiver and the microphone or speaker such that before a signal is transmitted by the system it is processed (scrambled) and after a signal is received by the system it is processed (unscrambled). The process operates as follows. First, an audio message is sampled and digitized by the A/D converter 12. The digitized audio signal then goes through the scrambling process described in detail above. The scrambled signal is converted to an analog audio signal and transmitted. Another user having a receiver receives the scrambled analog audio signal. First, the analog signal is digitized by the A/D converter 12. The digitized signal is then descrambled using the process described in detail above. The unscrambled signal is then converted to an analog signal and used by the second user. The second user can transmit a signal to the first user in the same manner. In doing so, the same process may be used to scramble and descramble the signals. Security of the system can be enhanced by making the arbitrary frequency translation vary with time (i.e. a "rolling code"). Using a rolling code requires that the receiver and transmitter be synchronized for proper signal recovery. An example of a rolling code which could be used with the present invention is a linear frequency sweep between −1333 Hz and +1333 Hz using a triangular waveform at a fixed frequency.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or rendered expedient without departing from the spirit and scope of the invention as further defined in the following claims.

TABLE 1

| Filter Coefficients | | | | | |
|---|---|---|---|---|---|
| Prototype | | Decimation | | Interpolation | |
| 0 | −2.205305518052E−04 | 2 | 2.275851302409E−04 | 0 | −2.205305518052E−04 |
| 1 | 0.000000000000E+00 | 5 | −2.485716376954E−04 | 3 | 2.331527998266E−04 |
| 2 | 2.275851302409E−04 | 8 | 2.830102729213E−04 | 6 | −2.585013164620E−04 |

TABLE 1-continued

| Filter Coefficients | | | | | |
|---|---|---|---|---|---|
| Prototype | | Decimation | | Interpolation | |
| 3 | 2.331527998266E−04 | 11 | −3.320197490674E−04 | 9 | 2.976705574171E−04 |
| 4 | 0.000000000000E+00 | 14 | 3.967623619240E−04 | 12 | −3.517927071342E−04 |
| 5 | −2.485716376954E−04 | 17 | −4.784552007364E−04 | 15 | 4.220469217452E−04 |
| 6 | −2.585013164620E−04 | 20 | 5.783849243560E−04 | 18 | −5.096716394244E−04 |
| 7 | 0.000000000000E+00 | 23 | −6.979270335716E−04 | 21 | 6.159807392728E−04 |
| 8 | 2.830102729213E−04 | 26 | 8.385708627374E−04 | 24 | −7.423845669075E−04 |
| 9 | 2.976705574171E−04 | 29 | −1.001951917719E−03 | 27 | 8.904171700677E−04 |
| 10 | 0.000000000000E+00 | 32 | 1.189893752056E−03 | 30 | −1.061771538615E−03 |
| 11 | −3.320197490674E−04 | 35 | −1.404462373476E−03 | 33 | 1.258345276792E−03 |
| 12 | −3.517927071342E−04 | 38 | 1.648037322448E−03 | 36 | −1.482300037079E−03 |
| 13 | 0.000000000000E+00 | 41 | −1.923405241040E−03 | 39 | 1.736139346364E−03 |
| 14 | 3.967623619240E−04 | 44 | 2.233884236363E−03 | 42 | −2.022811363332E−03 |
| 15 | 4.220469217452E−04 | 47 | −2.583491096565E−03 | 45 | 2.345845952009E−03 |
| 16 | 0.000000000000E+00 | 50 | 2.977169199358E−03 | 48 | −2.709539781498E−03 |
| 17 | −4.784552007364E−04 | 53 | −3.421104058204E−03 | 51 | 3.119209871580E−03 |
| 18 | −5.096716394244E−04 | 56 | 3.923168145219E−03 | 54 | −3.581546653393E−03 |
| 19 | 0.000000000000E+00 | 59 | −4.493561002177E−03 | 57 | 4.105114952428E−03 |
| 20 | 5.783849243560E−04 | 62 | 5.145752342378E−03 | 60 | −4.701080344259E−03 |
| 21 | 6.159807392728E−04 | 65 | −5.897909701585E−03 | 63 | 5.384288572145E−03 |
| 22 | 0.000000000000E+00 | 68 | 6.775128369502E−03 | 66 | −6.174915852090E−03 |
| 23 | −6.979270335716E−04 | 71 | −7.813044290997E−03 | 69 | 7.101076535614E−03 |
| 24 | −7.423845669075E−04 | 74 | 9.063946658274E−03 | 72 | −8.203105869431E−03 |
| 25 | 0.000000000000E+00 | 77 | −1.060767220498E−02 | 75 | 9.540924633329E−03 |
| 26 | 8.385708627374E−04 | 80 | 1.257230164754E−02 | 78 | −1.120742712530E−02 |
| 27 | 8.904171700677E−04 | 83 | −1.517676643478E−02 | 81 | 1.335454952611E−02 |
| 28 | 0.000000000000E+00 | 86 | 1.882823085319E−02 | 84 | −1.624866125510E−02 |
| 29 | −1.001951917719E−03 | 89 | −2.437882014615E−02 | 87 | 2.040264679367E−02 |
| 30 | −1.061771538615E−03 | 92 | 3.395997736072E−02 | 90 | −2.694572745691E−02 |
| 31 | 0.000000000000E+00 | 95 | −5.482048879583E−02 | 93 | 3.894424233437E−02 |
| 32 | 1.189893752056E−03 | 98 | 1.377066967680E−01 | 96 | −6.866592311874E−02 |
| 33 | 1.258345276792E−03 | 101 | 2.756010315166E−01 | 99 | 2.756010315166E−01 |
| 34 | 0.000000000000E+00 | 104 | −6.866592311874E−02 | 102 | 1.377066967680E−01 |
| 35 | −1.404462373476E−03 | 107 | 3.894424233437E−02 | 105 | −5.482048879583E−02 |
| 36 | −1.482300037079E−03 | 110 | −2.694572745691E−02 | 108 | 3.395997736072E−02 |
| 37 | 0.000000000000E+00 | 113 | 2.040264679367E−02 | 111 | −2.437882014615E−02 |
| 38 | 1.648037322448E−03 | 116 | −1.624866125510E−02 | 114 | 1.882823085319E−02 |
| 39 | 1.736139346364E−03 | 119 | 1.335454952611E−02 | 117 | −1.517676643478E−02 |
| 40 | 0.000000000000E+00 | 122 | −1.120742712530E−02 | 120 | 1.257230164754E−02 |
| 41 | −1.923405241040E−03 | 125 | 9.540924633329E−03 | 123 | −1.060767220498E−02 |
| 42 | −2.022811363332E−03 | 128 | −8.203105869431E−03 | 126 | 9.063946658274E−03 |
| 43 | 0.000000000000E+00 | 131 | 7.101076535614E−03 | 129 | −7.813044290997E−03 |
| 44 | 2.233884236363E−03 | 134 | −6.174915852090E−03 | 132 | 6.775128369502E−03 |
| 45 | 2.345845952009E−03 | 137 | 5.384288572145E−03 | 135 | −5.897909701585E−03 |
| 46 | 0.000000000000E+00 | 140 | −4.701080344259E−03 | 138 | 5.145752342378E−03 |
| 47 | −2.583491096565E−03 | 143 | 4.105114952428E−03 | 141 | −4.493561002177E−03 |
| 48 | −2.709539781498E−03 | 146 | −3.581546653393E−03 | 144 | 3.923168145219E−03 |
| 49 | 0.000000000000E+00 | 149 | 3.119209871580E−03 | 147 | −3.421104058204E−03 |
| 50 | 2.977169199358E−03 | 152 | −2.709539781498E−03 | 150 | 2.977169199358E−03 |
| 51 | 3.119209871580E−03 | 155 | 2.345845952009E−03 | 153 | −2.583491096565E−03 |
| 52 | 0.000000000000E+00 | 158 | −2.022811363332E−03 | 156 | 2.233884236363E−03 |
| 53 | −3.421104058204E−03 | 161 | 1.736139346364E−03 | 159 | −1.923405241040E−03 |
| 54 | −3.581546653393E−03 | 164 | −1.482300037079E−03 | 162 | 1.648037322448E−03 |
| 55 | 0.000000000000E+00 | 167 | 1.258345276792E−03 | 165 | −1.404462373476E−03 |
| 56 | 3.923168145219E−03 | 170 | −1.061771538615E−03 | 168 | 1.189893752056E−03 |
| 57 | 4.105114952428E−03 | 173 | 8.904171700677E−04 | 171 | −1.001951917719E−03 |
| 58 | 0.000000000000E+00 | 176 | −7.423845669075E−04 | 174 | 8.385708627374E−04 |
| 59 | −4.493561002177E−03 | 179 | 6.159807392728E−04 | 177 | −6.979270335716E−04 |
| 60 | −4.701080344259E−03 | 182 | −5.096716394244E−04 | 180 | 5.783849243560E−04 |
| 61 | 0.000000000000E+00 | 185 | 4.220469217452E−04 | 183 | −4.784552007364E−04 |
| 62 | 5.145752342378E−03 | 188 | −3.517927071342E−04 | 186 | 3.967623619240E−04 |
| 63 | 5.384288572145E−03 | 191 | 2.976705574171E−04 | 189 | −3.320197490674E−04 |
| 64 | 0.000000000000E+00 | 194 | −2.585013164620E−04 | 192 | 2.830102729213E−04 |
| 65 | −5.897909701585E−03 | 197 | 2.331527998266E−04 | 195 | −2.485716376954E−04 |
| 66 | −6.174915852090E−03 | 200 | −2.205305518052E−04 | 198 | 2.275851302409E−04 |
| 67 | 0.000000000000E+00 | 1 | 0.000000000000E+00 | 1 | 0.000000000000E+00 |
| 68 | 6.775128369502E−03 | 4 | 0.000000000000E+00 | 4 | 0.000000000000E+00 |
| 69 | 7.101076535614E−03 | 7 | 0.000000000000E+00 | 7 | 0.000000000000E+00 |
| 70 | 0.000000000000E+00 | 10 | 0.000000000000E+00 | 10 | 0.000000000000E+00 |
| 71 | −7.813044290997E−03 | 13 | 0.000000000000E+00 | 13 | 0.000000000000E+00 |
| 72 | −8.203105869431E−03 | 16 | 0.000000000000E+00 | 16 | 0.000000000000E+00 |
| 73 | 0.000000000000E+00 | 19 | 0.000000000000E+00 | 19 | 0.000000000000E+00 |
| 74 | 9.063946658274E−03 | 22 | 0.000000000000E+00 | 22 | 0.000000000000E+00 |
| 75 | 9.540924633329E−03 | 25 | 0.000000000000E+00 | 25 | 0.000000000000E+00 |
| 76 | 0.000000000000E+00 | 28 | 0.000000000000E+00 | 28 | 0.000000000000E+00 |
| 77 | −1.060767220498E−02 | 31 | 0.000000000000E+00 | 31 | 0.000000000000E+00 |

TABLE 1-continued

| Filter Coefficients | | | | | |
|---|---|---|---|---|---|
| Prototype | | Decimation | | Interpolation | |
| 78 | −1.120742712530E−02 | 34 | 0.000000000000E+00 | 34 | 0.000000000000E+00 |
| 79 | 0.000000000000E+00 | 37 | 0.000000000000E+00 | 37 | 0.000000000000E+00 |
| 80 | 1.257230164754E−02 | 40 | 0.000000000000E+00 | 40 | 0.000000000000E+00 |
| 81 | 1.335454952611E−02 | 43 | 0.000000000000E+00 | 43 | 0.000000000000E+00 |
| 82 | 0.000000000000E+00 | 46 | 0.000000000000E+00 | 46 | 0.000000000000E+00 |
| 83 | −1.517676643478E−02 | 49 | 0.000000000000E+00 | 49 | 0.000000000000E+00 |
| 84 | −1.624866125510E−02 | 52 | 0.000000000000E+00 | 52 | 0.000000000000E+00 |
| 85 | 0.000000000000E+00 | 55 | 0.000000000000E+00 | 55 | 0.000000000000E+00 |
| 86 | 1.882823085319E−02 | 58 | 0.000000000000E+00 | 58 | 0.000000000000E+00 |
| 87 | 2.040264679367E−02 | 61 | 0.000000000000E+00 | 61 | 0.000000000000E+00 |
| 88 | 0.000000000000E+00 | 64 | 0.000000000000E+00 | 64 | 0.000000000000E+00 |
| 89 | −2.437882014615E−02 | 67 | 0.000000000000E+00 | 67 | 0.000000000000E+00 |
| 90 | −2.694572745691E−02 | 70 | 0.000000000000E+00 | 70 | 0.000000000000E+00 |
| 91 | 0.000000000000E+00 | 73 | 0.000000000000E+00 | 73 | 0.000000000000E+00 |
| 92 | 3.395997736072E−02 | 76 | 0.000000000000E+00 | 76 | 0.000000000000E+00 |
| 93 | 3.894424233437E−02 | 79 | 0.000000000000E+00 | 79 | 0.000000000000E+00 |
| 94 | 0.000000000000E+00 | 82 | 0.000000000000E+00 | 82 | 0.000000000000E+00 |
| 95 | −5.482048879583E−02 | 85 | 0.000000000000E+00 | 85 | 0.000000000000E+00 |
| 96 | −6.866592311874E−02 | 88 | 0.000000000000E+00 | 88 | 0.000000000000E+00 |
| 97 | 0.000000000000E+00 | 91 | 0.000000000000E+00 | 91 | 0.000000000000E+00 |
| 98 | 1.377066967680E−01 | 94 | 0.000000000000E+00 | 94 | 0.000000000000E+00 |
| 99 | 2.756010315166E−01 | 97 | 0.000000000000E+00 | 97 | 0.000000000000E+00 |
| 100 | 3.333323077149E−01 | 100 | 3.333323077149E−01 | 100 | 3.333323077149E−01 |
| 101 | 2.756010315166E−01 | 103 | 0.000000000000E+00 | 103 | 0.000000000000E+00 |
| 102 | 1.377066967680E−01 | 106 | 0.000000000000E+00 | 106 | 0.000000000000E+00 |
| 103 | 0.000000000000E+00 | 109 | 0.000000000000E+00 | 109 | 0.000000000000E+00 |
| 104 | −6.866592311874E−02 | 112 | 0.000000000000E+00 | 112 | 0.000000000000E+00 |
| 105 | −5.482048879583E−02 | 115 | 0.000000000000E+00 | 115 | 0.000000000000E+00 |
| 106 | 0.000000000000E+00 | 118 | 0.000000000000E+00 | 118 | 0.000000000000E+00 |
| 107 | 3.894424233437E−02 | 121 | 0.000000000000E+00 | 121 | 0.000000000000E+00 |
| 108 | 3.395997736072E−02 | 124 | 0.000000000000E+00 | 124 | 0.000000000000E+00 |
| 109 | 0.000000000000E+00 | 127 | 0.000000000000E+00 | 127 | 0.000000000000E+00 |
| 110 | −2.694572745691E−02 | 130 | 0.000000000000E+00 | 130 | 0.000000000000E+00 |
| 111 | −2.437882014615E−02 | 133 | 0.000000000000E+00 | 133 | 0.000000000000E+00 |
| 112 | 0.000000000000E+00 | 136 | 0.000000000000E+00 | 136 | 0.000000000000E+00 |
| 113 | 2.040264679367E−02 | 139 | 0.000000000000E+00 | 139 | 0.000000000000E+00 |
| 114 | 1.882823085319E−02 | 142 | 0.000000000000E+00 | 142 | 0.000000000000E+00 |
| 115 | 0.000000000000E+00 | 145 | 0.000000000000E+00 | 145 | 0.000000000000E+00 |
| 116 | −1.624866125510E−02 | 148 | 0.000000000000E+00 | 148 | 0.000000000000E+00 |
| 117 | −1.517676643478E−02 | 151 | 0.000000000000E+00 | 151 | 0.000000000000E+00 |
| 118 | 0.000000000000E+00 | 154 | 0.000000000000E+00 | 154 | 0.000000000000E+00 |
| 119 | 1.335454952611E−02 | 157 | 0.000000000000E+00 | 157 | 0.000000000000E+00 |
| 120 | 1.257230164754E−02 | 160 | 0.000000000000E+00 | 160 | 0.000000000000E+00 |
| 121 | 0.000000000000E+00 | 163 | 0.000000000000E+00 | 163 | 0.000000000000E+00 |
| 122 | −1.120742712530E−02 | 166 | 0.000000000000E+00 | 166 | 0.000000000000E+00 |
| 123 | −1.060767220498E−02 | 169 | 0.000000000000E+00 | 169 | 0.000000000000E+00 |
| 124 | 0.000000000000E+00 | 172 | 0.000000000000E+00 | 172 | 0.000000000000E+00 |
| 125 | 9.540924633329E−03 | 175 | 0.000000000000E+00 | 175 | 0.000000000000E+00 |
| 126 | 9.063946658274E−03 | 178 | 0.000000000000E+00 | 178 | 0.000000000000E+00 |
| 127 | 0.000000000000E+00 | 181 | 0.000000000000E+00 | 181 | 0.000000000000E+00 |
| 128 | −8.203105869431E−03 | 184 | 0.000000000000E+00 | 184 | 0.000000000000E+00 |
| 129 | −7.813044290997E−03 | 187 | 0.000000000000E+00 | 187 | 0.000000000000E+00 |
| 130 | 0.000000000000E+00 | 190 | 0.000000000000E+00 | 190 | 0.000000000000E+00 |
| 131 | 7.101076535614E−03 | 193 | 0.000000000000E+00 | 193 | 0.000000000000E+00 |
| 132 | 6.775128369502E−03 | 196 | 0.000000000000E+00 | 196 | 0.000000000000E+00 |
| 133 | 0.000000000000E+00 | 199 | 0.000000000000E+00 | 199 | 0.000000000000E+00 |
| 134 | −6.174915852090E−03 | 0 | −2.205305518052E−04 | 2 | 2.275851302409E−04 |
| 135 | −5.897909701585E−03 | 3 | 2.331527998266E−04 | 5 | −2.485716376954E−04 |
| 136 | 0.000000000000E+00 | 6 | −2.585013164620E−04 | 8 | 2.830102729213E−04 |
| 137 | 5.384288572145E−03 | 9 | 2.976705574171E−04 | 11 | −3.320197490674E−04 |
| 138 | 5.145752342378E−03 | 12 | −3.517927071342E−04 | 14 | 3.967623619240E−04 |
| 139 | 0.000000000000E+00 | 15 | 4.220469217452E−04 | 17 | −4.784552007364E−04 |
| 140 | −4.701080344259E−03 | 18 | −5.096716394244E−04 | 20 | 5.783849243560E−04 |
| 141 | −4.493561002177E−03 | 21 | 6.159807392728E−04 | 23 | −6.979270335716E−04 |
| 142 | 0.000000000000E+00 | 24 | −7.423845669075E−04 | 26 | 8.385708627374E−04 |
| 143 | 4.105114952428E−03 | 27 | 8.904171700677E−04 | 29 | −1.001951917719E−03 |
| 144 | 3.923168145219E−03 | 30 | −1.061771538615E−03 | 32 | 1.189893752056E−03 |
| 145 | 0.000000000000E+00 | 33 | 1.258345276792E−03 | 35 | −1.404462373476E−03 |
| 146 | −3.581546653393E−03 | 36 | −1.482300037079E−03 | 38 | 1.648037322448E−03 |
| 147 | −3.421104058204E−03 | 39 | 1.736139346364E−03 | 41 | −1.923405241040E−03 |
| 148 | 0.000000000000E+00 | 42 | −2.022811363332E−03 | 44 | 2.233884236363E−03 |
| 149 | 3.119209871580E−03 | 45 | 2.345845952009E−03 | 47 | −2.583491096565E−03 |
| 150 | 2.977169199358E−03 | 48 | −2.709539781498E−03 | 50 | 2.977169199358E−03 |
| 151 | 0.000000000000E+00 | 51 | 3.119209871580E−03 | 53 | −3.421104058204E−03 |
| 152 | −2.709539781498E−03 | 54 | −3.581546653393E−03 | 56 | 3.923168145219E−03 |

TABLE 1-continued

| Filter Coefficients | | | | | |
|---|---|---|---|---|---|
| Prototype | | Decimation | | Interpolation | |
| 153 | −2.583491096565E−03 | 57 | 4.105114952428E−03 | 59 | −4.493561002177E−03 |
| 154 | 0.000000000000E+00 | 60 | −4.701080344259E−03 | 62 | 5.145752342378E−03 |
| 155 | 2.345845952009E−03 | 63 | 5.384288572145E−03 | 65 | −5.897909701585E−03 |
| 156 | 2.233884236363E−03 | 66 | −6.174915852090E−03 | 68 | 6.775128369502E−03 |
| 157 | 0.000000000000E+00 | 69 | 7.101076535614E−03 | 71 | −7.813044290997E−03 |
| 158 | −2.022811363332E−03 | 72 | −8.203105869431E−03 | 74 | 9.063946658274E−03 |
| 159 | −1.923405241040E−03 | 75 | 9.540924633329E−03 | 77 | −1.060767220498E−02 |
| 160 | 0.000000000000E+00 | 78 | −1.120742712530E−02 | 80 | 1.257230164754E−02 |
| 161 | 1.736139346364E−03 | 81 | 1.335454952611E−02 | 83 | −1.517676643478E−02 |
| 162 | 1.648037322448E−03 | 84 | −1.624866125510E−02 | 86 | 1.882823085319E−02 |
| 163 | 0.000000000000E+00 | 87 | 2.040264679367E−02 | 89 | −2.437882014615E−02 |
| 164 | −1.482300037079E−03 | 90 | −2.694572745691E−02 | 92 | 3.395997736072E−02 |
| 165 | −1.404462373476E−03 | 93 | 3.894424233437E−02 | 95 | −5.482048879583E−02 |
| 166 | 0.000000000000E+00 | 96 | −6.866592311874E−02 | 98 | 1.377066967680E−01 |
| 167 | 1.258345276792E−03 | 99 | 2.756010315166E−01 | 101 | 2.756010315166E−01 |
| 168 | 1.189893752056E−03 | 102 | 1.377066967680E−01 | 104 | −6.866592311874E−02 |
| 169 | 0.000000000000E+00 | 105 | −5.482048879583E−02 | 107 | 3.894424233437E−02 |
| 170 | −1.061771538615E−03 | 108 | 3.395997736072E−02 | 110 | −2.694572745691E−02 |
| 171 | −1.001951917719E−03 | 111 | −2.437882014615E−02 | 113 | 2.040264679367E−02 |
| 172 | 0.000000000000E+00 | 114 | 1.882823085319E−02 | 116 | −1.624866125510E−02 |
| 173 | 8.904171700677E−04 | 117 | −1.517676643478E−02 | 119 | 1.335454952611E−02 |
| 174 | 8.385708627374E−04 | 120 | 1.257230164754E−02 | 122 | −1.120742712530E−02 |
| 175 | 0.000000000000E+00 | 123 | −1.060767220498E−02 | 125 | 9.540924633329E−03 |
| 176 | −7.423845669075E−04 | 126 | 9.063946658274E−03 | 128 | −8.203105869431E−03 |
| 177 | −6.979270335716E−04 | 129 | −7.813044290997E−03 | 131 | 7.101076535614E−03 |
| 178 | 0.000000000000E+00 | 132 | 6.775128369502E−03 | 134 | −6.174915852090E−03 |
| 179 | 6.159807392728E−04 | 135 | −5.897909701585E−03 | 137 | 5.384288572145E−03 |
| 180 | 5.783849243560E−04 | 138 | 5.145752342378E−03 | 140 | −4.701080344259E−03 |
| 181 | 0.000000000000E+00 | 141 | −4.493561002177E−03 | 143 | 4.105114952428E−03 |
| 182 | −5.096716394244E−04 | 144 | 3.923168145219E−03 | 146 | −3.581546653393E−03 |
| 183 | −4.784552007364E−04 | 147 | −3.421104058204E−03 | 149 | 3.119209871580E−03 |
| 184 | 0.000000000000E+00 | 150 | 2.977169199358E−03 | 152 | −2.709539781498E−03 |
| 185 | 4.220469217452E−04 | 153 | −2.583491096565E−03 | 155 | 2.345845952009E−03 |
| 186 | 3.967623619240E−04 | 156 | 2.233884236363E−03 | 158 | −2.022811363332E−03 |
| 187 | 0.000000000000E+00 | 159 | −1.923405241040E−03 | 161 | 1.736139346364E−03 |
| 188 | −3.517927071342E−04 | 162 | 1.648037322448E−03 | 164 | −1.482300037079E−03 |
| 189 | −3.320197490674E−04 | 165 | −1.404462373476E−03 | 167 | 1.258345276792E−03 |
| 190 | 0.000000000000E+00 | 168 | 1.189893752056E−03 | 170 | −1.061771538615E−03 |
| 191 | 2.976705574171E−04 | 171 | −1.001951917719E−03 | 173 | 8.904171700677E−04 |
| 192 | 2.830102729213E−04 | 174 | 8.385708627374E−04 | 176 | −7.423845669075E−04 |
| 193 | 0.000000000000E+00 | 177 | −6.979270335716E−04 | 179 | 6.159807392728E−04 |
| 194 | −2.585013164620E−04 | 180 | 5.783849243560E−04 | 182 | −5.096716394244E−04 |
| 195 | −2.485716376954E−04 | 183 | −4.784552007364E−04 | 185 | 4.220469217452E−04 |
| 196 | 0.000000000000E+00 | 186 | 3.967623619240E−04 | 188 | −3.517927071342E−04 |
| 197 | 2.331527998266E−04 | 189 | −3.320197490674E−04 | 191 | 2.976705574171E−04 |
| 198 | 2.275851302409E−04 | 192 | 2.830102729213E−04 | 194 | −2.585013164620E−04 |
| 199 | 0.000000000000E+00 | 195 | −2.485716376954E−04 | 197 | 2.331527998266E−04 |
| 200 | −2.205305518052E−04 | 198 | 2.275851302409E−04 | 200 | −2.205305518052E−04 |

What is claimed is:

1. A method for creating voice privacy in electronic voice transmission systems comprising the steps of:

scrambling a voiced audio message by;

digitizing an analog representation of the message, the digitized representation having a spectrum, inverting and rotating the spectrum of the digitized representation of the message;

creating a scrambled audio message based on the inverted and rotated spectral representation of the message; and transmitting the scrambled audio message.

2. The method of claim 1 wherein the steps of inverting and rotating the spectrum of the digitized representation of the message are performed with software.

3. The method of claim 1 wherein the steps of digitizing the analog representation of the message and creating a scrambled audio message are performed with hardware.

4. The method of claim 1 further comprising the steps of:

receiving the scrambled audio message;

descrambling the scrambled audio message by;

digitizing an analog representation of the message, the digitized representation having a spectrum, inverting and rotating the spectrum of the digitized representation of the message;

creating an unscrambled audio message based on the inverted and rotated spectral representation of the message.

5. The method of claim 1 wherein the steps of scrambling and descrambling are performed identically.

6. The method of claim 1 wherein the digitized representation of the message is inverted by frequency shifting a lower sideband of the digitized analog representation of the message of 0 Hz while filtering out an upper sideband of the digitized analog representation of the message.

7. The method of claim 1 wherein the digitized representation of the message is inverted and rotated by:

translating a lower sideband of the digitized audio signal to create a complex baseband signal having a frequency spectrum, a real part, and a sampling rate;

filtering out an upper sideband;

reducing the sampling rate of the complex baseband signal;

applying a frequency shift to the complex baseband signal to create a rotation of the frequency spectrum of the complex baseband signal;

increasing the sampling rate of the complex baseband signal;

filtering the complex baseband signal to remove any undesired image components;

frequency shifting the complex baseband signal; and extracting the real part of the signal to produce a real signal.

8. A method of processing a digitized audio signal having a frequency spectrum comprising the steps of:

inverting the frequency spectrum of at least one sideband of the digitized audio signal;

applying a frequency shift to create a rotation of the inverted spectrum;

constructing a complex signal having a single sided frequency spectrum based on the inverted and rotated spectrum; and extracting the real component of the complex signal to produce a real signal.

9. The method of claim 8 wherein the steps are performed with software.

10. The method of claim 8 further comprising the step of converting the real signal to an analog signal.

11. The method of claim 10 further comprising the step of transmitting the analog signal.

12. The method of claim 8 wherein the frequency shift has a value and the rotation of the inverted spectrum has an amount, further comprising the step of altering the value of the applied frequency shift change by the amount of rotation of the inverted spectrum.

13. An apparatus for processing an audio signal comprising:

an analog to digital converter for sampling and digitizing an audio signal;

a processor connected to the analog to digital converter, said processor performing the processing steps of inverting and rotating the digitized audio signal; and a digital to analog converter connected to the processor to convert the digitized audio signal to an analog signal.

14. The apparatus of claim 13 wherein the processor performs the processing steps of inverting and rotating the digitized audio signal which has a frequency spectrum and a sampling rate by:

shifting the digitized signal to center negative frequency components of the frequency spectrum of the digitized signal to create a complex baseband signal having a real part, filtering out an upper sideband of the complex baseband signal, reducing the sampling rate of the complex baseband signal to create images of the filtered signal spectrum that are adjacent to the filtered complex baseband signal to create a critically sampled signal having a spectrum, applying a frequency shift to the critically sampled signal to create a rotation of the spectrum of the critically sampled signal, increasing the sampling rate of the complex baseband signal, filtering the complex baseband signal to remove any undesired image components of the complex baseband signal, shifting the complex baseband signal to an upper sideband to center the complex baseband signal in a desired positive frequency band, and extracting the real part of the signal to produce a real audio signal.

15. The apparatus of claim 14 wherein said filtering step is performed using a third band polyphase filter.

16. The apparatus of claim 13 further comprising a transmitter connected to the processor to transmit the analog signal.

17. A method of scrambling and descrambling an audio signal comprising the steps of:

(a) converting an analog audio signal to a digitized audio signal having a sampling rate and upper and lower sideband components;

(b) frequency shifting the digitized audio signal such that the lower sideband components are centered to create a complex baseband signal;

(c) filtering out the upper sideband components of the digitized audio signal;

(d) reducing the sampling rate of the digitized audio signal;

(e) applying a frequency shift to the complex baseband signal to create a rotation of the spectrum of the complex baseband signal having a sampling rate and a real part;

(f) increasing the sampling rate of the complex baseband signal;

(g) filtering the complex baseband signal to remove any undesired image components;

(h) shifting the filtered complex baseband signal such that the filtered complex baseband signal is centered at a desired frequency in the upper sideband;

(i) extracting the real part of the filtered complex baseband signal to produce a real signal;

(j) converting the real signal to an analog scrambled audio signal;

(k) repeating steps (a) through (i) with the scrambled analog audio signal; and (l) converting the real signal to an analog descrambled audio signal.

18. The method of claim 17 wherein steps (b) through (i) are performed with software.

19. The method of claim 17 wherein steps (a), (j) and (l) are performed with hardware.

20. The method of claim 17 further comprising the steps of (j1) and (j2) performed after step (j), where steps (j1) and (j2) are:

(j1) transmitting the analog scrambled audio signal; and (j2) receiving the transmitted analog scrambled audio signal.

* * * * *